(12) United States Patent
Bjorklund

(10) Patent No.: US 10,556,368 B1
(45) Date of Patent: Feb. 11, 2020

(54) THERMOPLASTIC PAVEMENT MARKING FLAKE, METHOD OF MANUFACTURING THERMOPLASTIC PAVEMENT MARKING FLAKE AND ITS APPLICATION

(71) Applicant: Fortson-Peek Company, Inc., Columbus, GA (US)

(72) Inventor: Mark S. Bjorklund, Midland, GA (US)

(73) Assignee: Fortson-Peek Company, Inc., Columbus, GA (US)

( * ) Notice: Subject to any disclaimer, the term of this patent is extended or adjusted under 35 U.S.C. 154(b) by 0 days.

(21) Appl. No.: 16/043,969

(22) Filed: Jul. 24, 2018

(51) Int. Cl.
| | | |
|---|---|---|
| *E01F 9/518* | (2016.01) | |
| *B29C 41/28* | (2006.01) | |
| *B29C 41/26* | (2006.01) | |
| *B29C 41/44* | (2006.01) | |
| *B29C 41/46* | (2006.01) | |
| *B29C 65/48* | (2006.01) | |
| *B29C 65/52* | (2006.01) | |
| *E01F 9/524* | (2016.01) | |
| *B29K 91/00* | (2006.01) | |
| *B29K 23/00* | (2006.01) | |
| *B29K 105/00* | (2006.01) | |

(52) U.S. Cl.
CPC ............ *B29C 41/28* (2013.01); *B29C 41/26* (2013.01); *B29C 41/44* (2013.01); *B29C 41/46* (2013.01); *B29C 65/4815* (2013.01); *B29C 65/522* (2013.01); *B29C 65/525* (2013.01); *E01F 9/518* (2016.02); *E01F 9/524* (2016.02); *B29K 2023/06* (2013.01); *B29K 2023/12* (2013.01); *B29K 2091/00* (2013.01); *B29K 2105/0097* (2013.01); *B29K 2909/08* (2013.01)

(58) Field of Classification Search
CPC ......... B29C 41/26; B29C 41/28; B29C 41/44; B29C 41/46; B29C 65/4815; B29C 65/522; B29C 65/525; B29K 2023/06; B29K 2023/12; B29K 2105/0097; B29K 2091/00; B29K 2909/08; E01F 9/518; E01F 9/524
USPC .............................................. 404/72, 75, 94
See application file for complete search history.

(56) References Cited

U.S. PATENT DOCUMENTS

| | | | |
|---|---|---|---|
| 3,863,758 A * | 2/1975 | Connelly ................ | B29C 70/12 206/524.1 |
| 4,795,604 A * | 1/1989 | Matsuzaki ................ | B01J 2/26 264/13 |
| 5,972,421 A | 10/1999 | Finley | |
| 2007/0102062 A1* | 5/2007 | Stager ................... | B27L 11/005 144/241 |
| 2015/0314485 A1 | 11/2015 | Puffer, Sr. et al. | |
| 2016/0024338 A1 | 1/2016 | Puffer, Sr. et al. | |
| 2016/0376467 A1 | 12/2016 | Puffer, Sr. et al. | |
| 2017/0009080 A1 | 1/2017 | Martyn et al. | |
| 2017/0158866 A1 | 6/2017 | Nguyen et al. | |

* cited by examiner

*Primary Examiner* — Raymond W Addie
(74) *Attorney, Agent, or Firm* — Thomas|Horstemeyer, LLP

(57) ABSTRACT

A method of making a thermoplastic road marking material includes using a flaking device to form thermoplastic flakes from a cooled mixture. A method of marking a pavement includes melting the thermoplastic flakes and applying the melted composition to a roadway by screeding, extruding or spraying.

23 Claims, 3 Drawing Sheets

THERMOPLASTIC PAVEMENT MARKING FLAKE, METHOD OF MANUFACTURING THERMOPLASTIC PAVEMENT MARKING FLAKE AND ITS APPLICATION

TECHNICAL FIELD

The present disclosure generally relates to compositions and methods relating to thermoplastic pavement marking flakes.

BACKGROUND

Thermoplastic pavement markings are commonly used for directing vehicle traffic. The markings are durable, retroreflective, and, when applied on asphalt road surfaces in a molten state to the surface of the road, they cure quickly to a solid state. This allows the road to be opened to traffic sooner than pavement markings that are required to dry or chemically cure. The prior art markings usually comprise a reflective portion (typically glass spheres), a binder portion (resins, waxes, plasticizing oil, polymers), a pigment portion, and a filler portion (usually calcium carbonate). The most common form (and least expensive) of this product is a dry blend of all the ingredients. This dry blend method has a cost advantage, but final the product can be dusty, the filler portion can absorb moisture, and the dry blend usually takes longer to melt as the resins, polymers, and waxes have to melt and be absorbed by the filler portion to liquefy. This process usually additionally requires a significant amount of agitation of the mixture.

There are other forms of prior art pavement markings that have reduced the dust and melt speed by pre-melting the material and cooling it. One such form of manufacturing is block form, where the materials of the markings are is blended and heated to a molten state, poured into wax or fluoropolymer release coated boxes and allowed to cool. Although material supplied in this form is less dusty and does not absorb as much moisture, it usually must be broken up into pieces in order to melt quickly, and is therefore labor intensive.

Another form of the pavement markings is pelletized. Pelletized thermoplastic markings are less dusty, absorb less moisture, and are less labor intensive. However, they are expensive to manufacture and require costly equipment. The raw ingredients usually are melted, extruded, cut into pellets, and to keep the pellets from remassing in storage, they are coated with a release coating in a subsequent process. The glass beads can be damaged in some extrusion/pelletizing processes which also leads to premature wear of equipment parts. The amount of bead damage could also cause the product to not meet certain specifications for bead gradation.

Accordingly, there is a need to address the aforementioned deficiencies and inadequacies of the prior art pavement markings. New methods and compositions to create free flowing thermoplastic materials for road markings that reduce dust, moisture absorption, and labor in addition to minimizing cost and production effort are desired.

SUMMARY

The present disclosure is directed to a method of manufacturing thermoplastic road marking material in flake form, and the road markings formed by this method, and the composition of the road markings.

Described herein are methods of manufacturing thermoplastic pavement marking material in a batch or continuous process, which all of or a portion of the waxes and/or all or a portion of the glass spheres in the formulation are applied to a flaker belt or drum prior to and/or immediately after the remainder of the ingredients of the formulation prior to being removed from the flaker belt/drum in the form of a flake that does not deform or re-mass subsequent to packaging, or where all or a portion of the wax portion is applied after the other ingredients are flaked and is added subsequently as a coating to the flake.

Also described herein are thermoplastic flakes for pavement markings created by methods as described herein and methods of use. Unlike pellets, which require costly equipment, flakes as described herein can be created by flaking a solid composition off of a flake drum or flake belt. Furthermore, in certain embodiments according to the present disclosure, flakes are created without the need for a subsequent coating step, unlike pellets. Flakes as described herein also have a larger surface area to mass ratio than pellets to ensure fast melting.

In an embodiment, methods of manufacturing thermoplastic road marking material in flake form are described. Methods as described herein include providing flake ingredients, the flake ingredients including a non-adhesive portion comprising one or more non-adhesive ingredients, and a remaining ingredient portion, wherein the remaining ingredient portion includes remaining ingredients and an adhesive portion, wherein the adhesive portion comprises adhesive ingredients; heating the remaining ingredient portion and mixing; applying to a flaking device one or more of the non-adhesive ingredients, in a manner so that the softening point of the separate materials are higher than that of the combined flake ingredients; applying the remaining ingredient portion in the molten state to the flaking device; subsequently cooling the applied materials into a solid; and flaking the cooled material from the flaking device in a single process, thereby producing one or more multi-layered free-flowing thermoplastic flakes. The non-adhesive flake ingredients can be applied prior to the remaining ingredients, subsequently to the remaining ingredients, or both. The flaking device can be a flaker drum or belt.

In other embodiments, methods of manufacturing thermoplastic road marking material in flake form are described. Additional methods as described herein include providing flake ingredients, wherein the flake ingredients include a non-adhesive portion comprising one or more non-adhesive ingredients, and a remaining ingredient portion, wherein the remaining ingredient portion include remaining ingredients and an adhesive portion, wherein the adhesive portion comprises adhesive ingredients; heating and mixing the remaining ingredient portion; applying to a flaking device the remaining ingredient portion and subsequently cooling the applied materials into a solid; flaking the solid material from the flaking device thereby producing one or more multi-layered free-flowing thermoplastic flakes; and subsequently coating the free-flowing thermoplastic flakes with a portion or all of the non-adhesive portion in a manner so that the softening point of the separate materials are higher than that of the combined materials. The flaking device is a flaker drum or belt.

Also described herein are methods of pavement marking. Methods of pavement markings as described herein can comprise: providing thermoplastic flakes as described herein; heating and melting the flakes into a liquid; applying the resultant thermoplastic liquid to the roadway. The application of the thermoplastic liquid can be done via screeding, extruding, or spraying.

Other systems, methods, features, and advantages of the present disclosure for thermoplastic pavement markings, will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
FIGS. 1A-1C show embodiments of compositions as created by methods as described herein after cooling following experimental testing with heat and pressure.

Described below are compositions, methods of manufacture, and methods of use relating to thermoplastic pavement markings. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

Definitions

As used herein, "flake" refers to a thermoplastic composition with a large surface-area to mass ratio which is not in pellet form, or it refers to the process of producing a flake or flakes. Flakes can be multilayered. Flakes can be coated, but may not be coated on each and every surface, and may not be fully encapsulated by the coating. Flakes as described herein have planar or approximately planar surfaces. A thickness of between 0.040" and 0.180" and a length/diameter of less than 1" would be most desirable for processing, packaging and maintain free-flowing properties.

As used herein, "clump" refers to numerous flakes sticking together to form a larger mass.

As used herein, "portion" refers to one or more ingredients of a formulation that, in total, is less than the entirety of ingredients.

DISCUSSION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

It is to be understood that, unless otherwise indicated, the present disclosure is not limited to particular types of methods and systems relating for extracting subject motion in imaging of the subject, and particular software[s] for post-processing and analysis, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. In this specification and in the claims that follow, reference will be made to a number of terms that shall be defined to have the following meanings unless a contrary intention is apparent.

DESCRIPTION

Formulations for thermoplastic pavement markings usually comprise a reflective portion (typically glass spheres); a binder portion (resins, waxes, plasticizing oil, polymers); a pigment portion; and a filler portion. The binder portion may comprise both adhesive resins, and non-adhesive waxes and plasticizing oil. While these waxes and oils are non-adhesive by themselves, when blended with the resin, they reduce the softening point and increase the deformability of the resins at lower temperatures. The filler is usually calcium carbonate due to its low cost. The pigment used is dependent on the color desired.

Thermoplastic pavement marking is rather brittle at room temperature and lends itself well to flaking, but when formulated to meet most government specifications, it is tacky at elevated temperatures and the flakes could re-mass if stored in elevated temperatures. By removing some of the non-adhesive materials of the formula, and applying them in a separate layer or layers on the flaking belt from the remaining ingredients, the softening point of the remaining adhesive ingredients is increased, and the flakes are less likely to re-mass or clump after they are packaged. Additionally by having a layer of non-adhesive ingredients on the larger surface area side(s) of the flake the flakes are even less likely to stick together and remain free flowing. Flaking equipment is typically less expensive than extrusion/pelletizing equipment. Flakes made by the described method can be formed in a single process, have minimal dust, have a large surface area to mass to ensure fast melting, do not absorb moisture, and are less likely to re-mass at moderately elevated temperatures due to their increased softening point and reduced tack.

Described herein are methods of manufacturing thermoplastic pavement marking material in a batch or continuous process, which all of or a portion of the waxes and/or all or a portion of the glass spheres in the formulation are applied to a flaker belt or drum prior to and/or immediately after the remainder of the ingredients of the formulation prior to being removed from the flaker belt/drum in the form of a flake that does not deform or re-mass subsequent to packaging, or where all or a portion of the wax portion is applied after the other ingredients are flaked and is added subsequently as a coating to the flake.

Also described herein are thermoplastic flakes for pavement markings created by methods as described herein and methods of use. Unlike pellets, which require costly equipment, flakes as described herein can be created by flaking a solid composition off of a flake drum or flake belt. Furthermore, in certain embodiments according to the present disclosure, flakes are created without the need for a subsequent coating step, unlike pellets. Flakes as described herein also have a larger surface area to mass ratio than pellets to ensure fast melting.

Also as described herein, in some embodiments, flakes according to the present disclosure are not coated on every side, and are not encapsulated by a coating. Only sides of the flakes with the largest surface are coated. In certain embodiments, flakes as described herein are also not homogenous like the core of pellets, and comprise a multi-layered structure of components.

Without intending to be limiting, formulations of thermoplastic as described herein can comprise a reflective portion (for example: glass spheres); a binder portion (for example: resins, waxes, plasticizing oil, polymers); a pigment portion; and a filler portion (for example: calcium carbonate).

The reflective portion of thermoplastic formulations as described herein can comprise one or more reflective ingredients usually glass microspheres, or ceramic core bonded elements. The reflective portion can be in an amount of about 20% to about 50% of the thermoplastic formulation.

In an embodiment, the reflective portion comprises about 30% of the thermoplastic formulation. In an embodiment, the reflective portion is glass spheres. In certain embodiments, the reflective portion is glass beads or spheres in an amount of about 20% to about 50% of the thermoplastic formulation. Glass beads or spheres as described herein can be of a refractive index from 1.5 to 2.3 and can have a diameter of about 50 μm to about 1000 μm. In an embodiment, the reflective portion is glass spheres in an amount of the thermoplastic formulation of about 30%.

The binder portion of thermoplastic formulations as described herein can comprise one or more resins. Resins according to the present disclosure can be hydrocarbon resins, such as C-5, or C9, or they can be maleic modified glycerol esters of rosin, and/or rosin esters, individually or in combination. In embodiment, the resins are present in the formulation in an amount of about 1% to about 10%. In certain embodiments, the resins are maleic modified Glycerol Ester of Rosin and Rosin Ester, individually or in combination. In embodiment, the resins are maleic modified Glycerol Ester of Rosin and Rosin Ester in an amount of about 8% and about 4% to about 5%, respectively.

The binder portion of thermoplastic formulations as described herein can comprise one or more waxes. Waxes according to the present disclosure can be castor wax or polypropylene wax (such as Crayvallac WN-1110 from Arkema, Inc.). Other waxes derived from natural and/or synthetic sources can be suitable such as soy-based waxes, carnuaba, polyethylene, or PTFE (or PFTE-based), for example, provided that they have a high enough melt point not to melt together in typical storage conditions. In certain embodiments, the wax or waxes are castor wax or polypropylene wax, individually or in combination. In an embodiment, the wax is a 90%/10% blend of castor wax and a polypropylene wax. In embodiment, the wax or waxes are in an amount of about 0.5% to about 4%. In an embodiment, the wax is present in the thermoplastic formulation in an amount of about 2-3%. In an embodiment, the wax is a 90%/10% blend of castor wax and a polypropylene wax present in the thermoplastic formulation in an amount of about 2-3%.

The binder portion of thermoplastic formulations as described herein can comprise plasticizing oil. Plasticizing oil according to the present disclosure can be long oil alkyd resin, castor oil, DI-isononyl phosphate, or paraffin oil. In certain embodiments, the plasticizing oil is long oil alkyd resin. In certain embodiments, the plasticizing oil is in an amount of about 0.5% to about 4%. In an embodiment, the plasticizing oil is present in the thermoplastic formulation in an amount of about 2-3%. In an embodiment, the plasticizing oil is a long oil alkyd resin present in the thermoplastic formulation in an amount of about 2-3%.

The binder portion of thermoplastic formulations as described herein can comprise one or more polymers. Polymers according to the present disclosure can be EVA, Polyamide, Butly esters, or polyvinyl butyl. In certain embodiments, the polymer or polymers are ethylene-vinyl acetate (EVA) polymer. In embodiment, the polymer or polymers are in an amount of about 0.5% to about 2%. In certain embodiments, the polymer or polymers are ethylene-vinyl acetate (EVA) polymer in an amount of the thermoplastic formulation of about 1%.

The thermoplastic formulations as described herein can comprise a pigment portion. Pigment can be titanium dioxide for pigmentation for white color, other inorganic pigments such as iron oxide, carbon black, or organic pigments such as yellow, red, blue, green, or violet would be typical pigments used for other colored pavement markings. Pigment can be present in the thermoplastic formulation in an amount of about 0.5% to about 12%. In an embodiment, the pigment is present in the thermoplastic formulation in an amount of about 10%. In an embodiment, the pigment is titanium dioxide. In an embodiment, the pigment is titanium dioxide in an amount of about 10%. A skilled artisan would be able to pick a pigment according to the desired color or shade of thermoplastic.

The filler portion of thermoplastic formulations as described herein can comprise Calcium carbonate, diatomaceous earth, kaolin, or talc. The filler can be in an amount of about 15% to about 60% of the thermoplastic formulation. In certain embodiments, the filler portion comprises calcium carbonate. In certain embodiments, the filler portion is about 41%-42% of the thermoplastic formulation. In certain embodiments, the filler portion is calcium carbonate in an amount of about 41% to about 42% of the thermoplastic formulation.

An embodiment of a thermoplastic formulation that is formulated to meet AASHTO M249 is discussed further at length in Example 1 below. It is noted that the percentages of the ingredients in thermoplastic formulations can vary widely, at least in the United States, as many states have their own specifications for thermoplastic pavement marking material.

As described herein are methods of making thermoplastic flakes for road markings. Methods as described herein remove some of the non-adhesive materials of the thermoplastic formulation, and apply them in a separate layer or layers on the flaking belt from the remaining ingredients. By doing so, the softening point of the remaining adhesive ingredients is increased, and the flakes are less likely to re-mass or clump after they are packaged. Additionally by having a layer of non-adhesive ingredients on the larger surface area surfaces of the flake, the flakes are even less likely to stick together and remain free flowing.

Flaking equipment is typically less expensive than extrusion/pelletizing equipment, and methods as described herein improve upon existing methodology by lowering cost of production compared to pellets. Examples of belt type flakers are those manufactured by Berndorf Band Group of Gilberts, Il, and drum type flakers are those manufactured by Buffalovak in Tonowanda, N.Y. Flakes made by the described method also can be formed in a single process, have minimal dust, have a large surface area to mass to ensure fast melting, do not absorb moisture, and are less likely to re-mass at moderately elevated temperatures due to their increased softening point and reduced tack.

In an embodiment, a method of manufacturing thermoplastic road marking material in flake form is described. First, flake ingredients (ingredients of the thermoplastic formulation) are provided, wherein the flake ingredients comprise a non-adhesive portion comprising one or more non-adhesive ingredients, and a remaining ingredient portion, wherein the remaining ingredient portion comprises remaining ingredients and an adhesive portion, wherein the adhesive portion comprises adhesive ingredient. In certain aspects, the adhesive portion comprising the adhesive ingredients can be the resin ingredients or resin ingredients and plasticizer, and the non-adhesive portion can be the remaining non-adhesive ingredients of the thermoplastic composition.

One or more of the non-adhesive flake ingredients can then be applied to a flaker drum or belt in a manner so that the softening point of the separate materials are higher than that of the combined materials. This manner can be prior to the remaining ingredients, subsequently to the remaining ingredients, or both. The materials can be subsequently cooled into a solid preferably below 100° F., or until brittle and flaked from the drum/belt. In this way, the flakes from the belt/drum can be made in a single process, wherein the flaking produces one or more multi-layered free-flowing thermoplastic flakes.

As used in methods as described herein, the non-adhesive ingredients of the thermoplastic formulation can comprise waxes, polymers, filler, and glass spheres.

Application of the ingredients can be done with extrusion spray or weir. The non-adhesive portion can be applied to the flaker belt in the molten state via spray, extrude, weir, or doctor blade.

In additional embodiments of methods as described herein, the non-adhesive portion can be sprinkled on the flake drum or belt prior to the application of the adhesive portion, subsequent to the application of the adhesive portion, or both. The non-adhesive portion can be melted with the heat from the adhesive portion melts, wherein the melting bonds the non-adhesive and adhesive portion together.

Additional embodiments of methods as described herein can further comprise emulsifying the non-adhesive portion in water. After emulsification, the emulsion can be sprayed onto the drum or belt prior to applying the adhesive portion on the drum or belt, subsequent to applying the adhesive portion on the drum or belt, or both to assist in cooling the material and forming a non-adhesive top layer, lower layer, or both prior to flaking.

In other aspects, a method of manufacturing thermoplastic road marking material in flake form, can comprise providing flake ingredients, wherein the flake ingredients comprise a non-adhesive portion comprising one or more non-adhesive ingredients, and a remaining ingredient portion, wherein the remaining ingredient portion comprises remaining ingredients and an adhesive portion, wherein the adhesive portion comprises adhesive ingredients. In certain aspects, the adhesive portion comprising the adhesive ingredients can be the resin ingredients or resin ingredients and plasticizer, and the non-adhesive portion can be the remaining non-adhesive ingredients of the thermoplastic composition.

The remaining ingredient portion (comprising the adhesive portion and adhesive ingredients) can be applied to a flaker drum or belt and subsequently cooled into a solid. The solid material can be flaked from the belt/drum. After flaking, the flakes can be subsequently coated with a portion or all of the non-adhesive portion in a manner so that the softening point of the separate materials are higher than that of the combined materials. This coating process can be performed by common coating method such as spray coating where the flakes are passed under spray nozzles containing the non-adhesive ingredients either on a belt, fluidized bed, or in a tumble drum such as the rotamat by Walther-Trowal of Grand Rapids, Mich.

EXAMPLES

Now having described various embodiments of the disclosure, in general, the examples below describe some additional embodiments. While embodiments of the present disclosure are described in connection with the examples and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

Introduction

Described herein are embodiments of a method of manufacturing thermoplastic pavement marking material in a batch or continuous process. According to embodiments of methods as described herein, all of or a portion of the waxes and/or all or a portion of the glass spheres in the thermoplastic formulation can be applied to a flaker belt or drum prior to and/or immediately after the remainder of the ingredients of the formulation prior to being removed from the flaker belt/drum in the form of a flake that does not deform or re-mass subsequent to packaging. According to other embodiments of methods as described herein, all or a portion of the wax portion can be applied after the other ingredients are flaked and is added subsequently as a coating to the flake.

Thermoplastic pavement markings are commonly used around the world for road markings because they are durable, retroreflective, and cure very quickly by cooling to a solid so the road may be opened to traffic sooner than pavement markings that are required to dry or chemically cure.

Thermoplastic formulations comprise a reflective portion (typically glass spheres; a binder portion (resins, waxes, plasticizing oil, polymers); a pigment portion; and a filler portion (usually calcium carbonate). The binder portion comprises of both adhesive resins, and non-adhesive waxes and plasticizing oil. While these waxes and oils are non-adhesive by themselves, when blended with the resin, they reduce the softening point and increase the deformability of the resins at lower temperatures. The filler can be calcium carbonate due to its low cost. The pigment used can be dependent on the color desired, and a skilled artisan could pick a pigment according to a desired color with undue experimentation.

The most common form (and least expensive) of this product is a dry blend of all the ingredients. This method has a cost advantage, but the product can be dusty, the filler portion can absorb moisture, and the dry blend takes longer to melt as the resins, polymers, and waxes have to melt and be absorbed by the filler portion to liquefy. This requires a significant amount of agitation as well. There are numerous other forms that have avoided the dust and melt speed by pre-melting the material and cooling it. One such form of manufacturing is block form, where the material is blended and heated to a molten state, poured into wax or fluoropolymer release coated boxes and allowed to cool. Although material supplied in this form is not dusty and does not absorb moisture, it has to be broken up into pieces in order to melt quickly, and is labor intensive. Another form of the product is pelletized. Pelletized thermoplastic is not dusty, does not absorb moisture, is not labor intensive, but it is expensive to manufacture as requires costly equipment, must be melted, extruded, cut into pellets in one process, and to keep the pellets from remassing in storage, they must be coated with a release coating in a subsequent process. The glass beads can be damaged in some extrusion/pelletizing processes which also leads to premature wear of equipment parts. The amount of bead damage could also cause the product to not meet certain specifications for bead gradation.

Thermoplastic pavement marking is rather brittle at room temperature and lends itself well to flaking, but when formulated to meet most government specifications, it is tacky at elevated temperatures and the flakes could re-mass if stored in elevated temperatures. By removing some of the non-adhesive materials of the formula, and applying them as a coating after the flake is formed, or in a separate layer or layers on the flaking belt from the remaining ingredients, the softening point of the remaining adhesive ingredients is increased, and the flakes are less likely to re-mass or clump after they are packaged. Additionally by having a layer of nonadhesive ingredients on the larger surface area surfaces of the flake, the flakes are even less likely to stick together and remain free flowing. Flaking equipment is typically less expensive than extrusion/pelletizing equipment. Flakes made by the described method can be formed in a single process, have minimal dust, have a large surface area to mass to ensure fast melting, do not absorb moisture, and are less likely to re-mass at moderately elevated temperatures due to their increased softening point and reduced tack.

Three formulations were formed according to the present example: Formulation 1, Formulation 2, and Formulation 3. Shown in Table 1 below is an example of a thermoplastic pavement marking formulation, Formulation 1:

| Maleic modified glycerol ester of rosin | 8% |
|---|---|
| Rosin Ester | 4.5% |
| Plasticizing oil | 2.6% |
| Wax | 2.35% |
| Titanium Dioxide | 10% |
| Glass Spheres | 30% |
| Calcium Carbonate | 41.55% |
| EVA polymer | 1% |

The Plasticizing oil in this case was a long oil alkyd resin, but other plasticizing oils including castor oil, DI-isononyl phosphate are acceptable substitutes, or a paraffin oil could be used with hydrocarbon resin such as C-5 instead of the Maleic resin and/or rosin ester for hydrocarbon based formulas. The wax used in this case was a 90%/10% blend of Castor wax and a polypropylene wax—Crayvallac WN-1110 available from Arkema, Inc., but other waxes derived from natural and/or synthetics would be suitable such as Soy based waxes, Carnuaba, Polyethylene, PTFE provided that they have a high enough melt point not to melt together in typical storage conditions. Titanium Dioxide is for pigmentation for white color, other inorganic pigments such as iron oxide, carbon black, or organic pigments such as yellow, red, blue, green, or violet would be typical pigments used for other colored pavement markings. The above formula (Formulation 1) is typical, formulated to meet AASHTO M249, and the percentages of the ingredients vary widely as many states have their own specifications for thermoplastic pavement marking material.

The softening point of the formulation above (Formulation 1) is 206° F. (96.7° C.).

Formulation 2 was created by removing the wax component from Formulation 1 above (also referred to herein as "the remaining ingredient portion" or "the remaining ingredient portion of Formulation 2"). The softening point of Formulation 2 was 254° F. (123.3° C.) and the softening point of the wax component was 222° F. (105.5° C.).

Formulation 3 was created by removing the wax component and 8% of the glass spheres from Formulation 1 above (also referred to herein as "the remaining ingredient portion" or "the remaining ingredient portion of Formulation 3"). The softening point of Formulation 3 (without the wax and 8% of the glass spheres) was 260° F. (126.7° C.).

From the Formulations 1-3 above, several thermoplastic products were created.

Formulation 1 was heated and mixed at 400° F. and extruded onto a belt, allowed to cool, and then flaked off the belt to form Product 1.

The wax component and remaining ingredient component of Formulation 2 were heated (wax component) and heated and mixed mixed (remaining ingredient portion) to 300° F. and 400° F. respectively. The wax component was then extruded onto the belt immediately followed by the remaining ingredient component. The extruded product was allowed to cool and was flaked off the belt to form Product 2A.

Again the wax component and the remaining ingredient component of Formulation 2 were heated and mixed to 300° F. and 400° F. Half of the wax component was applied to the belt, followed by the remaining ingredient component, followed by the second half of the wax component. The extrusion was allowed to cool and was flaked off the belt to form Product 2B.

Again the wax component and the remaining ingredient component of Formulation 2 were heated and mixed to 300 F and 400 F and the remaining ingredients component was applied to the belt, allowed to cool, and then flaked off the belt. The resulting flakes were then completely coated with the wax portion to form Product 2C.

Finally, the wax component and the remaining ingredient component of Formulation 3 were heated and mixed to 300° F. and 400° F. respectively, mixed and the wax component was applied to the belt followed by the remaining ingredient component. While the remaining ingredient component was still molten, the 8% of glass spheres was sprinkled on top to where they partially embed themselves. The material was then allowed to cool and flaked off the belt forming Product 3.

Figure 1B:
Figure 1C:

The flake products formed above—1, 2A, 2B, and 3—were then subject to environment stress tests for signs of deformation, re-massing, or signs of clumping. Flakes were placed into an oven at 140° F. (60° C.) between a 16 oz. ink can and the can lid under a 1.1 kg load for 4 hours. The flakes were then removed and allowed to cool before observation. The following observations were recorded in Table 2 below, and pictures of the flakes after the environmental stress test are shown in FIGS. 1A and 1B:

| Product | Deformation of Flakes @ 140° F. | Clumping of Flakes @ 140° F. |
| --- | --- | --- |
| 1 | Yes | Yes—completely clumped |
| 2A | No | Moderate clumping |
| 2B | No | No clumping |
| 2C | No | No clumping |
| 3 | No | Very minimal clumping |

It is noted that although some minor clumping was shown in Product 3, the test was performed at the highest temperatures expected in storage in the hottest parts of the United States, and therefore Product 3 would be considered an acceptable product.

Ratios, concentrations, amounts, and other numerical data may be expressed in a range format. It is to be understood that such a range format is used for convenience and brevity, and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figure of the numerical value. In addition, the phrase "about 'x' to 'y'" includes "about 'x' to about 'y'".

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Therefore, at least the following is claimed:

1. A method of manufacturing thermoplastic road marking material in flake form, comprising:
   providing flake ingredients, wherein the flake ingredients comprise a non-adhesive portion comprising one or more non-adhesive ingredients, and a remaining ingredient portion, wherein the remaining ingredient portion comprises remaining ingredients and an adhesive portion, wherein the adhesive portion comprises adhesive ingredients;
   heating the remaining ingredient portion and mixing;
   applying to a flaking device one or more of the non-adhesive ingredients, in a manner so that the softening point of the separate materials are higher than that of the combined flake ingredients;
   applying the remaining ingredient portion in the molten state to the flaking device;
   subsequently cooling the applied materials into a solid; and
   flaking the cooled material from the flaking device in a single process, wherein the flaking produces one or more multi-layered free-flowing thermoplastic flakes.

2. The method of claim 1, wherein the one or more of the non-adhesive flake ingredients are applied prior to the remaining ingredients, subsequently to the remaining ingredients, or both.

3. The method of claim 1, wherein the flaking device is a flaker drum or belt.

4. The method of claim 1, wherein the one or more non-adhesive ingredients are waxes, polymers, filler, or glass spheres, individually or in combination.

5. The method of claim 4 where the waxes are one or more of soybean, castor, polyethylene, polypropylene, or PTFE-based waxes, individually or in combination.

6. The method of claim 1, wherein the applying is done with extrusion spray or weir.

7. The method of claim 1 where the non-adhesive portion is applied to the flaking device in the molten state via spray, extrude, weir, or doctor blade.

8. The method of claim 1, further comprising:
   sprinkling the non-adhesive portion on the flaking device prior to the application of the molten adhesive portion, subsequent to the application of the molten adhesive portion, or both; and
   melting the non-adhesive portion with the heat from the adhesive portion, wherein the melting bonds the non-adhesive and adhesive portion together.

9. The manufacturing method of claim 1, further comprising:
   emulsifying the non-adhesive portion in water; and spraying the emulsion onto the flaking device prior to applying the adhesive portion on the drum or belt, subsequent to applying the adhesive portion on the drum or belt, or both to assist in cooling the material and forming a non-adhesive top layer, lower layer, or both prior to flaking.

10. The free-flowing thermoplastic flake resulting from the method of claim 1.

11. A method of manufacturing thermoplastic road marking material in flake form, comprising:
providing flake ingredients, wherein the flake ingredients comprise a non-adhesive portion comprising one or more non-adhesive ingredients, and a remaining ingredient portion, wherein the remaining ingredient portion comprises remaining ingredients and an adhesive portion, wherein the adhesive portion comprises adhesive ingredients;
heating and mixing the remaining ingredient portion;
applying to a flaking device the remaining ingredient portion and subsequently cooling the applied materials into a solid;
flaking the solid material from the flaking device wherein the flaking produces one or more multi-layered free-flowing thermoplastic flakes; and
subsequently coating the free-flowing thermoplastic flakes with a portion or all of the non-adhesive portion in a manner so that the softening point of the separate materials are higher than that of the combined materials.

12. The method of claim 11, wherein the flaking device is a flaker drum or belt.

13. The method of claim 11, wherein the non-adhesive ingredients comprise waxes, polymers, filler, and glass spheres.

14. The method of claim 13 where the waxes are one or more of soybean, castor, polyethylene, polypropylene, PTFE-based, individually or in combination.

15. The method of claim 11, wherein the applying is done with extrusion spray or weir.

16. The method of claim 11, wherein the remaining ingredient portion is applied to the flaking device in the molten state via spray, extrude, weir, or doctor blade.

17. The method of claim 11, further comprising:
sprinkling a portion of the non-adhesive portion on the flaking device prior to the application of the adhesive portion, subsequent to the application of the adhesive portion, or both; and
melting the portion of the non-adhesive portion with the heat from the adhesive portion melts, wherein the melting bonds the non-adhesive and adhesive portion together.

18. The method of claim 11, further comprising:
emulsifying the portion of the non-adhesive portion in water; and
spraying the emulsion onto the flaking device prior to applying the adhesive portion on the drum or belt, subsequent to applying the adhesive portion on the drum or belt, or both to assist in cooling the material and forming a non-adhesive top layer, lower layer, or both prior to flaking.

19. The free-flowing thermoplastic flake resulting from the method of claim 11.

20. A method of pavement marking, comprising:
providing thermoplastic flakes;
heating and melting the flakes into a thermoplastic liquid;
applying the resultant thermoplastic liquid to the roadway.

21. The method of claim 20, wherein the applying is screeding, extruding, or spraying.

22. The method of claim 20, wherein the thermoplastic flakes comprise flakes created by the method of claim 1.

23. The method of claim 20, wherein the thermoplastic flakes comprise flakes created by the method of claim 11.

* * * * *